(Model.)

H. H. BUTLER.
CULTIVATOR.

No. 267,670.  Patented Nov. 21, 1882.

Witnesses:
J. W. Stewart
D. E. Devlin

Inventor:
Howard H. Butler
By Wm K White Atty

UNITED STATES PATENT OFFICE.

HOWARD H. BUTLER, OF ZANESVILLE, OHIO, ASSIGNOR OF ONE-HALF TO THOMAS JENKINS, OF MOLINE, ILLINOIS.

CULTIVATOR.

SPECIFICATION forming part of Letters Patent No. 267,670, dated November 21, 1882.

Application filed May 27, 1882. (Model.)

*To all whom it may concern:*

Be it known that I, HOWARD H. BUTLER, of Zanesville, in the county of Muskingum and State of Ohio, have invented certain new and useful Improvements in Wheel-Cultivators, relating to the coupling-spring and draft-lever; and I do hereby declare that the following is a full, clear, and exact description of the same, reference being had to the accompanying drawings, forming a part of this specification; in which—

Figure 1:
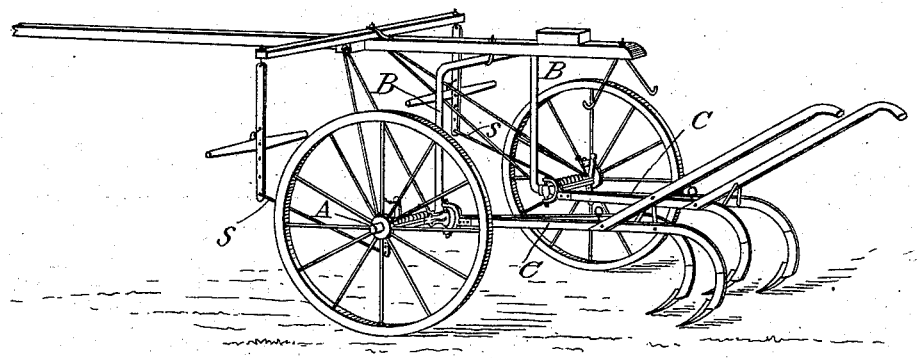
Figures 2, 3:
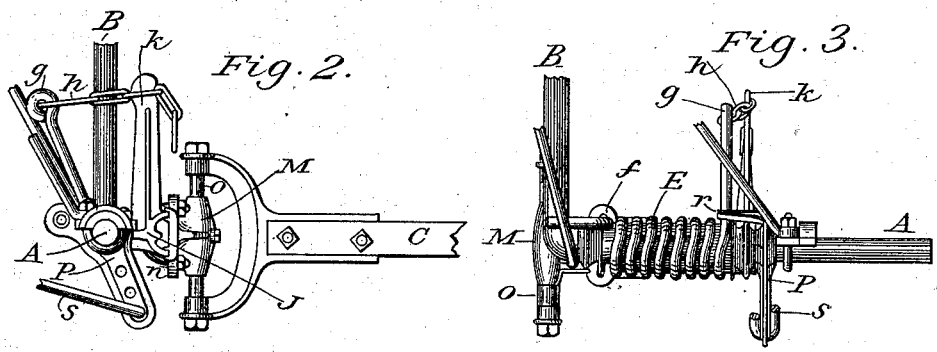
Figure 4:
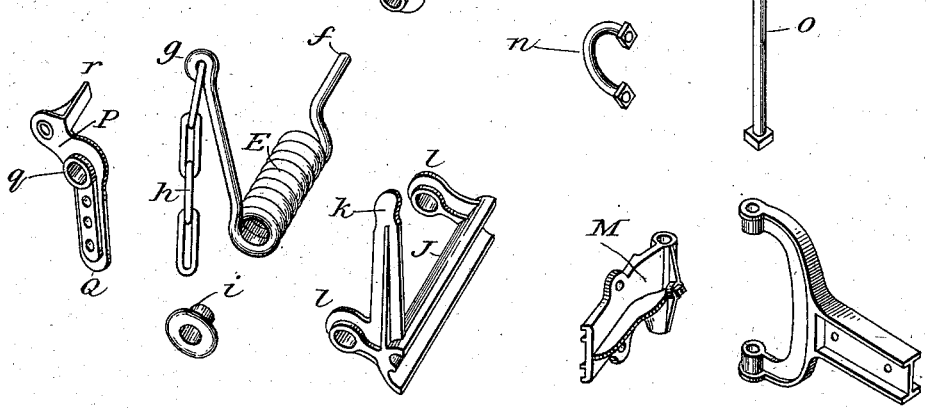

Figure 1 is a perspective view of the form of cultivator to which my coupling-spring and draft-lever may be applied, and showing the usual form of applying the same. Fig. 2 is a side view of the coupling-spring and draft-lever, looking in a line with the axle toward the arch. Fig. 3 is a front view of the same, looking at right angles to the axle and toward the plow-beam. Fig. 4 is a perspective view of the several parts of the coupling-spring and draft-lever.

My invention relates to an improved form of coupling for fastening and adjusting the forward end of the beam or plows to the axle and a spring and draft-lever.

I do not claim the application of a spring to sustain the weight of a plow-beam.

In my improvements I aim to overcome some objectionable results from springs now used in wheeled cultivators. That I may be more readily understood I will refer to the springs in general use and the results. First, a spring so constructed and adjusted as to exert an upward or raising force upon the plow-beam, also to exert a downward or depressing force upon the plow-beam, depends for this result upon the plow-beam passing above or below a given point. It is apparent, therefore, if the ground be uneven the spring will exert a force when least needed, or a force in the opposite direction of that required. If a portion of the ground be hard, as compared with other portions, or very soft, it will be seen that springs of this class may work improperly.

Another class of springs in general use are those which exert a continuous upward or raising force upon the plow-beam, and in this class, unless the plows are firmly held in the ground by the operator, the tendency is for the plows to rise out of the ground, or partially so, in striking hard soil. The springs now in common use are constructed with other parts so as to frequently get out of repair, and they also take up much of the space between the wheel and arch.

Another objection existing in wheeled cultivators now in use is the inability to use an arch of sufficient width to avoid injuring the stalks of corn when at an advanced stage of growth, and yet permit the cultivation of the corn in an early stage of its growth sufficiently near to the plants without the operator using considerable power to hold the plow-beams so as to bring the plows near to the plants.

It can be readily seen that whenever the plows follow in a direct line from where the beam is attached to the axle it is easier for the operator; but if the operator is required to hold the beam in such position that the plows will be in the ground at the right or left of such direct line it requires the exertion of more or less strength by the operator, and is necessarily very fatiguing. I obviate this objection by a device which I shall more fully explain hereinafter, whereby I can so regulate the connection of the front end of the plow-beam to the axle as to have such point of connection inside of the arch or outside thereof, at pleasure.

My coupling consists of a yoke or frame, J, with an adjustable head, M, for coupling thereto. The yoke or frame J has a projection or lever-arm, *k*, extending upward or any other desired direction, adapted to connect the chain or strap *h* thereto, which connects with the end of the coil-spring, designated as *g*. The proper tension of the spring E is regulated by increasing or decreasing the distance between the projection or lever-arm *k* of the yoke or frame J and the end of the coil-spring, designated as *g*, through the medium of the chain or strap *h*. The two arms *l l* of yoke or frame J, which are at right angles, or substantially so, with the back of yoke in a line with the axle, are each perforated at their front ends, so as to admit the axle A to pass easily through the same, thereby permitting the yoke-head and plow-beam attached to such yoke to move vertically. This may be accomplished in the manner as here shown, or by other mechanical means substantially the same as here described. As, for instance, the two arms l l of yoke or frame J may be fastened rigidly to the axle, and at the opposite ends be perforated, so as to admit of a rock shaft or bar instead of the rigid back, as here shown; or the yoke or frame J may be hinged to the axle; or a pipe-box may be used on the yoke or frame and produce the same result as here shown.

The adjustable yoke-head M is grooved on the back of its two outer edges, so as to admit the top and bottom edges of the yoke or frame J, similar to the well-known tongue and groove. At the inner end of the yoke-head it is perforated to permit the bolt o to pass easily through the same, and to the upper and lower ends of this bolt is attached the plow-beam C, substantially as shown by the drawings, permitting lateral motion thereby to the plow-beam. A staple or clip-bolt, n, fits around the back of the yoke or frame J, the ends of which pass through perforations in the yoke-head M and are securely fastened at any point desired by means of nuts or their equivalents.

I adopt the yoke or frame J and the yoke-head M to accomplish two distinct objects which I claim to be improvements over the present cultivators. In nearly all wheeled cultivators the plow-beams are coupled to the axle, which coupling takes up more or less of the space upon the axle, and when the operator desires to shift his plow-beams nearer to the rows of corn he cannot do so beyond the point where the coupling comes in contact with the arch, and to operate the plows while drawing in a straight line he cannot get near the rows of corn unless the arch is very narrow, and a narrow arch is very injurious to the corn-stalks when advanced in growth or spread out by wind-storms. As I have already pointed out, this is an objection.

In my improvement the clip-bolt or staple n passes through the yoke-head M at or near its center, so that the yoke-head may slide on the back of the yoke or frame J until the clip-bolt or staple n comes in contact with the inner arm, l, of the yoke or frame J, thereby bringing the inner end of the yoke-head M where the plow-beam is coupled inside of the arch, and by this means I gain about four inches in distance or eight inches for the two plow-beams, which thereby enables me to use an arch of sufficient width to avoid the cornstalks, and still to so adjust my plow-beams that the plows may run close to the rows of corn and at the same time be in a direct line of the draft. Between the two arms l l of the yoke or frame J, when attached to the axle A, is afforded ample space for the adjustment of the spring around or upon the axle.

The coil or spiral spring E is adjusted around the axle A, between the arms l l of the yoke or frame J, the inner end, f, of this spring resting against an arm extending from the arch; or it may rest against the front side of the arch, the outer end, g, of which spring extends vertically, or partially so, at right angles with the axle, and in line with the lever-arm or projection k of the yoke or frame J, to which it is connected by the chain or strap h. I also use two sleeved washers, i i, perforated to fit loosely upon the axle A, and constructed so as to admit ends of the coil of spring E to rest upon them, thereby keeping the spring at a proper distance from the axle to prevent friction or binding thereon. The draft-lever P has a perforation or hole therein, q, to admit loosely therein the axle A. At the top or upper end of the draft-lever is a projection or arm, r. The draft-lever is also perforated with other holes, as shown by the drawings, to admit of hitching or connecting the draft-rod s. When the draft-rod s is hitched or attached to any of the holes or perforations in the draft-lever P, below the axle A, which pass through the hole or perforation q in the draft-lever, any strain or draft upon the draft-rod draws the lower part of the draft-lever beneath the axle forward, and throws or forces the upper part of the draft-lever above the axle backward, and this upper part of the draft-lever being so constructed as to come in contact with the spring in an opposite direction from its tension arrests or controls the tension of the spring during such time as the strain or draft is upon the draft-rod; but if the draft-rod s is hitched or attached to the hole or perforation in the draft-lever above the axle, any strain upon the draft-rod will not then effect the tension of the spring.

I use a sand cap or stop, t, which is bolted by means of a staple or clip to the axle A, between the draft-lever and hub of the wheel, thus permitting the draft-lever to work freely on the axle between the sand-cap and outer arm, l, of the yoke or frame J. The draft-lever works independently on the spring E, regulating and governing the tension of the spring when the plow is being operated, and does not directly affect the plow-beams or plows except as it affects the force of the spring in acting thereon. When the draft-rod is hitched to the draft-lever below the axle, and the plows come in contact with hard or uneven ground, the draft from the team becomes stronger and the pressure of the upper part of the lever is greater against the tension of the spring, thus relieving the plow-beams entirely or partially from the upward strain from the spring, and permitting the weight of the plow-beam and plows to aid in holding the plows to a uniform depth in the ground. When plowing in soft soil the draft is lessened, and consequently the upper part of the lever does not act with as great force upon the lever, thus permitting the spring to act more or less upon the plows. If an obstruction is met with while the team is in motion, the operator has only the weight of the plows and beam to lift, whereas if the draft-rod was directly connected with the plow-beam, so as to depress the plow-beams or hold them in such position while in operation, the operator then, in lifting the plows, would have also the draft of the team to lift against. If the team is stopped, then the draft upon the draft-rod ceases, as also the pressure of the upper portion of the lever against the spring; and if the operator desires to raise his plows out of the ground, the spring, now operating, assists him in doing so.

I do not claim broadly the application of a spring, wound around the axle sufficiently to give it the desired tension, nor connecting the tension end of such spring to a projection or arm of a sleeve, pipe-box, yoke or frame; nor do I claim a yoke or frame attached to the axle, nor broadly the application of a device whereby the plow-beams may follow in a direct line inside or outside of the arch by an adjustment of the connection of the front end of the plow-beam to the coupling at the right or left of the arch by the operator, nor broadly a device to shift the point of connection of the front end of the plow-beam to the right or left upon the sleeve, pipe-box, yoke or frame; but What I do claim as my invention, and desire to secure by Letters Patent, is—

1. The combination, with the arched axle and the plow-beams, of the coiled spring E, placed around the axle and secured one end to the axle, the other end forming a projecting arm, g, secured by links to the plow-beam coupling, substantially as shown and described.

2. The yoke or frame J, having perforated arms or brackets l l and lever-arm k, in combination with the yoke-head M, having perforated extension and set-screw, the plow-beam C, bolt o, and staple n, substantially as shown and described.

3. The combination of the draft-lever P, having projection r and perforations above and below the axle, with the spring E, the yoke J, yoke-head M, plow-beam C, and draft attachment s, substantially as shown and described.

HOWARD H. BUTLER.

Witnesses:
WILLIAM K. WHITE,
J. W. STEWART.